US012774404B2

(12) United States Patent
Suwa

(10) Patent No.: US 12,774,404 B2
(45) Date of Patent: Oct. 27, 2026

(54) ACRYLIC POLYMER RELEASE AGENT, RELEASE SHEET, TAPE AND DOUBLE-SIDED TAPE

(71) Applicant: 3M INNOVATIVE PROPERTIES COMPANY, St. Paul, MN (US)

(72) Inventor: Toshihiro Suwa, Tokyo (JP)

(73) Assignee: 3M Innovative Properties Company, St. Paul, MN (US)

(*) Notice: Subject to any disclaimer, the term of this patent is extended or adjusted under 35 U.S.C. 154(b) by 317 days.

(21) Appl. No.: 18/262,021

(22) PCT Filed: Jan. 26, 2022

(86) PCT No.: PCT/IB2022/050675
§ 371 (c)(1),
(2) Date: Jul. 19, 2023

(87) PCT Pub. No.: WO2022/162550
PCT Pub. Date: Aug. 4, 2022

(65) Prior Publication Data

US 2025/0101272 A1 Mar. 27, 2025

(30) Foreign Application Priority Data

Jan. 29, 2021 (JP) ................................ 2021-013590

(51) Int. Cl.
*C09J 7/40* (2018.01)
*C09D 5/20* (2006.01)
*C09D 133/08* (2006.01)
*C09J 7/38* (2018.01)

(52) U.S. Cl.
CPC ................ *C09J 7/401* (2018.01); *C09D 5/20* (2013.01); *C09D 133/08* (2013.01); *C09J 7/38* (2018.01); *C09J 7/405* (2018.01); *C09J 2301/124* (2020.08); *C09J 2433/005* (2013.01); *Y10T 428/1476* (2015.01)

(58) Field of Classification Search
None
See application file for complete search history.

(56) References Cited

U.S. PATENT DOCUMENTS 6,660,354 B2 12/2003 Suwa et al.
7,153,629 B2 12/2006 Sasaki et al.
7,816,477 B2 10/2010 Suwa
8,114,504 B2 2/2012 Yakushidoh et al.
8,137,807 B2 3/2012 Clapper et al.
2003/0152768 A1 8/2003 Melancon et al.
2005/0118352 A1* 6/2005 Suwa ................ C08F 220/1818 427/553
2009/0000727 A1 1/2009 Kumar et al.
2010/0160562 A1 6/2010 Beppu et al.
2011/0126968 A1 6/2011 Determan et al.
2012/0219794 A1 8/2012 Seth et al.
2018/0029329 A1 2/2018 Hirano et al.
2018/0312729 A1 11/2018 Hirano et al.
2024/0092071 A1* 3/2024 Suwa ....................... C08J 7/123

FOREIGN PATENT DOCUMENTS

| | | | |
|---|---|---|---|
| EP | 3587526 | A1 | 1/2020 |
| JP | 2000119411 | A | 4/2000 |
| JP | 2001240775 | A | 9/2001 |
| JP | 2003327945 | A | 11/2003 |
| JP | 2005205813 | A | 8/2005 |
| JP | 2015063584 | A | 4/2015 |
| JP | 2017165818 | A | 9/2017 |
| WO | 2003095578 | A1 | 11/2003 |
| WO | 2007055225 | A1 | 5/2007 |
| WO | 2011063082 | A2 | 5/2011 |
| WO | 2022162555 | A1 | 8/2022 |
| WO | 2022224081 | A1 | 10/2022 |

OTHER PUBLICATIONS

ATX204SF, "Tape and Adhesive", Technical Datasheet, 2003, 3 pages.
Database WPI, Week 201766, Sep. 21, 2017, Thompson Scientific, London, GB, AN 2017-651443, XP002806227.
International Search Report received for PCT International Application No. PCT/IB2022/050675 mailed on Apr. 29, 2022, 5 pages.

* cited by examiner

*Primary Examiner* — Anish P Desai
(74) *Attorney, Agent, or Firm* — Ann K. Gallagher

(57) ABSTRACT

Object Provided is a long chain alkyl-based release agent useful in production of a light release liner that can be used in a light release surface of an adhesive transfer tape. Solution means An acrylic polymer release agent according to an embodiment includes a polymerization product of a polymerizable precursor composition containing an acrylate monomer having a branched alkyl group having 24 or more carbon atoms and an acrylic monomer having a benzophenone structure.

9 Claims, 1 Drawing Sheet

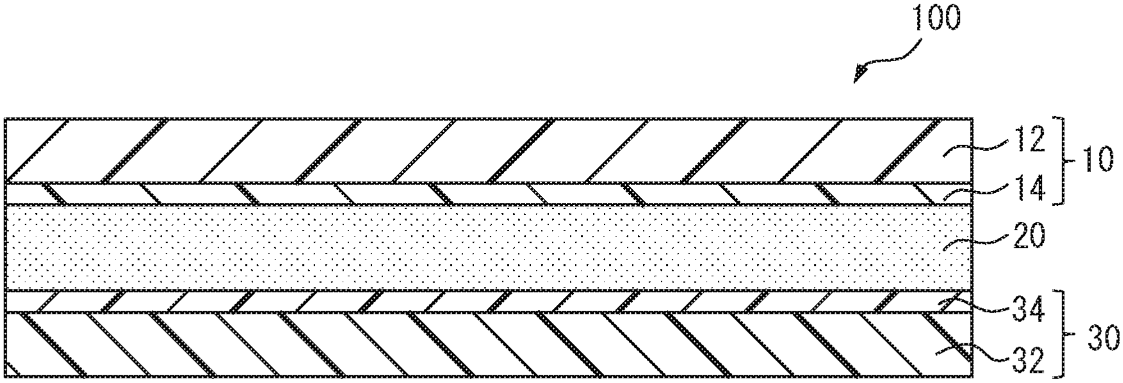
100
12
10
14
20
34
30
32

ACRYLIC POLYMER RELEASE AGENT, RELEASE SHEET, TAPE AND DOUBLE-SIDED TAPE

TECHNICAL FIELD

The present disclosure relates to an acrylic polymer release agent, a release sheet, a tape, and a double-sided tape.

BACKGROUND ART

A silicone-based release agent, a fluorine-based release agent, and a long chain alkyl-based release agent have been known as release agents used in release liners or release sheets of adhesive products such as adhesive tapes. Among these, a long chain alkyl-based release agent does not have a problem with silicone contamination that may occur with a silicone-based release liner. As such, an adhesive transfer tape (ATT) with a long chain alkyl-based release liner, and a double-sided tape or a single-sided tape have been widely used in electronic industries such as hard disk drive (HDD) applications.

Patent Document 1 (JP 2017-165818 A) discloses a release agent composition containing a liquid polymer (A) and an acrylic polymer (B), in which the acrylic polymer (B) contains a constituent unit derived from long chain alkyl (meth)acrylate (b1) represented by Formula (1) and a constituent unit derived from alkyl (meth)acrylate (b2) represented by Formula (2).

Patent Document 2 (JP 2001-240775 A) discloses "a release agent forming polymerizable composition containing first alkyl (meth)acrylate having an alkyl group having 12 to 30 carbon atoms, second alkyl (meth)acrylate having an alkyl group having from 1 to 12 carbon atoms, and a polymerization initiator of the first alkyl (meth)acrylate and the second alkyl (meth)acrylate.

Patent Document 3 (JP 2003-327945 A) discloses "an acrylic release agent precursor containing poly (meth) acrylic acid ester having an ultraviolet active group and having a storage modulus from $1\times10^2$ to $3\times10^6$ Pa at 20° C. and a frequency of 1 Hz, in which a contact angle is 15° or greater with respect to a mixed solution of methanol and water (volume ratio 90/10) with a wet tension of 25.4 mN/m by irradiation with ultraviolet rays".

CITATION LIST

Patent Literature

[Patent Document 1]: JP 2017-165818 A
[Patent Document 2]: JP 2001-240775 A
[Patent Document 3]: JP 2003-327945 A

SUMMARY OF INVENTION

Technical Problem

In order to produce an adhesive transfer tape used in the electronics industry, such as HDD applications, one surface (light release surface) of an adhesive layer is typically covered with a light release liner and the other surface (heavy release surface) is covered with a heavy release liner. In the adhesive transfer tape, a releasing force ratio of the heavy release surface to the light release surface is required to be a predetermined value or greater in order to release the release liner from the adhesive layer in an appropriate order and to reliably apply the adhesive layer to an adherend. On the other hand, it is desirable that the heavy release surface is also easily released.

In such an adhesive transfer tape, a long chain alkyl-based release liner is generally used for the heavy release surface and a fluorine-based release liner is used for the light release surface. In a case where the long chain alkyl-based release liner in the related art was used for the light release surface, it was difficult to have a sufficiently large releasing force ratio of the heavy release surface to the light release surface.

However, while a fluorine-based material is capable of achieving light releasing, it is necessary to consider disposal and often require the use of a fluorine-based solvent, and thus it is preferable to avoid use as much as possible depending on the application. Therefore, a non-silicone non-fluorine (Non-Silicone, Non-Fluorine, NSNF) release sheet containing no silicone or fluorine compound and a tape using the same are desired.

The present disclosure provides a long chain alkyl-based release agent useful in production of a light release liner that can be used in a light release surface of an adhesive transfer tape. The present disclosure also provides a release sheet, a tape, and a double-sided tape using such a long chain alkyl-based release agent.

Solution to Problem

According to a first embodiment, there is provided an acrylic polymer release agent containing a polymerization product of a polymerizable precursor composition containing an acrylate monomer having a branched alkyl group having 24 or more carbon atoms and an acrylic monomer having a benzophenone structure.

According to a second embodiment, there is provided an acrylic polymer release agent containing a polymerization product of a polymerizable precursor composition containing a 99 mass % or more of an acrylate monomer having a branched alkyl group having 24 or more carbon atoms, based on the polymerizable component.

According to another embodiment, there is provided a release sheet including a substrate and a release coating containing a cured product of the acrylic polymer release agent disposed on the substrate.

According to still another embodiment, there is provided a tape including the release sheet and an adhesive layer laminated on the release coating of the release sheet.

According to still another embodiment, there is provided a double-sided tape including the release sheet, an adhesive layer, and a second release sheet in this order, in which the second release sheet includes a second substrate and a heavy release coating containing a cured product of a second acrylic polymer release agent disposed on the second substrate, the second acrylic polymer release agent contains a polymerization product of a second polymerizable precursor composition containing a 50 mass % or greater of an acrylate monomer having an alkyl group having less than 24 carbon atoms, based on a polymerizable component, and the release coating of the release sheet and the heavy release coating of the second release sheet are laminated to be in contact with the adhesive layer.

Advantageous Effects of Invention

The acrylic polymer release agent of the present disclosure is useful in the production of a light release liner that can be used in a light release surface of an adhesive transfer tape. The release sheet using the acrylic polymer release agent of the present disclosure can be particularly suitably used in a NSNF adhesive transfer tape as a release sheet for a tape and a double-sided tape.

Note that the above description is not construed as disclosure of all of embodiments of the present invention and advantages related to the present invention.

BRIEF DESCRIPTION OF DRAWINGS

FIG. 1 is a schematic cross-sectional view of a double-sided tape of an embodiment.

DESCRIPTION OF EMBODIMENTS

Hereinafter, the present invention will be described in more detail with reference to the drawings for the purpose of illustrating representative embodiments of the present invention, but the present invention is not limited to these embodiments.

In the present disclosure, the term "(meth)acrylic" refers to acrylic or methacrylic, and the term "(meth)acrylate" refers to acrylate or methacrylate.

In the present disclosure, a "sheet" encompasses an article referred to as a "film". In the present disclosure, "double-sided tape" also encompasses those referred to as "transfer tape" in certain applications.

In the present disclosure, "pressure-sensitive adhesive (ness)" refers to the characteristic of a material or composition that the material or composition adheres to various surfaces with just light pressure for a short time in the temperature range of usage, such as from 0° C. to 50° C., and does not exhibit a phase change (from liquid to solid). In the present disclosure, "adhesive (ness)" is used interchangeably with "pressure-sensitive adhesive (ness)".

In the present disclosure, "disposed on" refers to not only the case of being directly disposed on, but also the case of being indirectly disposed on, that is, disposed on via another material or layer.

In the present disclosure, "polymerizable component" refers to a component capable of radical polymerization with an acrylate monomer having a branched alkyl group having 24 or more carbon atoms.

According to a first embodiment, an acrylic polymer release agent contains a polymerization product of a polymerizable precursor composition containing an acrylate monomer having a branched alkyl group having 24 or more carbon atoms and an acrylic monomer having a benzophenone structure. The acrylic polymer release agent containing such a polymerization product can be cured by irradiation with radiation such as ultraviolet rays or electron beams to form a release coating that corresponds to a light release surface on the substrate.

The polymerizable precursor composition contains an acrylate monomer having a branched alkyl group having 24 or more carbon atoms and an acrylic monomer having a benzophenone structure.

Since a long chain alkyl moiety of the branched alkyl group having 24 or more carbon atoms not only reduces the surface energy of the cured product of the acrylic polymer release agent, but also is branched, the crystallinity of the cured product is lowered and the storage elastic modulus of the cured product is lowered since the alkyl group is branched. With this, it is possible to form a release coating that exhibits a smooth (non-jerky) light releasing force at a wide release rate.

Examples of the acrylate monomer having a branched alkyl group having 24 or more carbon atoms include 2-decyl tetradecyl acrylate (24 carbon atoms), 2-dodecyl hexadecyl acrylate (28 carbon atoms), and 2-tetradecyl octadecyl acrylate (32 carbon atoms). The acrylate monomer having a branched alkyl group having 24 or more carbon atoms can be used alone or in combination of two or more types thereof.

The branched alkyl group having 24 or more carbon atoms is preferably monobranched. As a result, the long chain alkyl moiety of the branched alkyl group can be secured to form a release coating that exhibits a light releasing force.

A branching position of the branched alkyl group having 24 or more carbon atoms is preferably a 2-position or a 4-position. As a result, the crystallinity of the cured product can be effectively reduced, and smoother releasing characteristics can be obtained.

The number of carbon atoms in the branched chain of the branched alkyl group having 24 or more carbon atoms is preferably 8 or more, 10 or more, or 12 or more. As a result, a plurality of long chain alkyl moieties of the branched alkyl group can be secured to form a release coating that exhibits a lighter releasing force.

The content of the acrylate monomer having a branched alkyl group having 24 or more carbon atoms in the polymerizable precursor composition is preferably about 90 mass % or greater, about 95 mass % or greater, or about 99 mass % or greater, based on the polymerizable component.

The benzophenone structure of an acrylic monomer having a benzophenone structure generates radicals by irradiation with radiation such as electron beams or ultraviolet rays. The generated radicals promote crosslinking of the polymerization product of the polymerizable precursor composition and bonding of the cured product resulting from the crosslinking to the substrate. As a result, the acrylic polymer release agent can be efficiently cured by low irradiation amount of radiation, and the cohesion of the cured product and the adhesion between the cured product and the substrate are improved, and the transition of the cured product to the adhesive agent is suppressed. As a result of suppressing the transition of the cured product to the adhesive agent, a residual adhesive force of the adhesive agent can be maintained at a high level.

Examples of the acrylic monomers having a benzophenone structure include 4-acryloyloxybenzophenone. 4-acryloyloxyethoxybenzophenone, 4-acryloyloxy-4'-methoxybenzophenone, 4-acryloyloxyethoxy-4'-methoxybenzophenone, 4-acryloyloxy-4-bromobenzophenone, and 4-acryloyloxyethoxy-4'-bromobenzophenone. The acrylic monomer having a benzophenone structure can be used alone or in combination of two or more types thereof.

The content of the acrylic monomer having a benzophenone structure in the polymerizable precursor composition is preferably about 1 mass % or less, about 0.8 mass % or less, or about 0.5 mass % or less, based on the polymerizable component. By setting the content of the acrylic monomer having a benzophenone structure to be about 1 mass % or less, it is possible to suppress the increase in releasing force. The content of the acrylic monomer having a benzophenone structure in the polymerizable precursor composition is preferably about 0.01 mass % or greater, about 0.02 mass % or greater, or about 0.05 mass % or greater, based on the polymerizable component. By setting the content of the acrylic monomer having a benzophenone structure to be about 0.01 mass % or greater, crosslinking of the polymerization product and bonding of the cured product to the substrate can be effectively promoted.

The polymerizable precursor composition may contain an acrylate monomer having an alkyl group having from 4 to 20 carbon atoms. The alkyl group having from 4 to 20 carbon atoms may be linear or branched. Examples of the acrylate monomer having an alkyl group having from 4 to 20 carbon atoms include butyl acrylate (4 carbon atoms), hexyl acrylate (6 carbon atoms), octyl acrylate (8 carbon atoms), 2-ethylhexyl acrylate (8 carbon atoms), decyl acrylate (10 carbon atoms), 8-methylnonyl acrylate (10 carbon atoms), dodecyl acrylate (12 carbon atoms), tridecyl acrylate (13 carbon atoms), tetradecyl acrylate (14 carbon atoms), hexadecyl acrylate (16 carbon atoms), octadecyl acrylate (18 carbon atoms), isooctadecyl acrylate (18 carbon atoms), 2-hexyldodecyl acrylate (18 carbon atoms), 2-octyldecyl acrylate (18 carbon atoms), and icosyl acrylate (20 carbon atoms).

The content of the acrylate monomer having an alkyl group having from 4 to 20 carbon atoms in the polymerizable precursor composition is preferably about 30 mass % or less, about 15 mass % or less, or about 8 mass % or less, based on the polymerizable component.

In an embodiment, an acrylate monomer having a branched alkyl group having 24 or more carbon atoms and an acrylate monomer having an alkyl group having from 4 to 20 carbon atoms do not have a polar functional group such as a carboxy group, a hydroxyl group, an amino group, or an amide group on the alkyl group. In this embodiment, the light releasing force can be maintained even after the cured product has been exposed at high temperature.

The polymerizable precursor composition generally contains a polymerization initiator. By using the polymerization initiator, it is possible to promote the initiation of a polymerization reaction of the polymerizable component in the polymerizable precursor composition, for example, an acrylate monomer having a branched alkyl group having 24 or more carbon atoms, and an acrylic monomer having a benzophenone structure. As the polymerization initiator, a typical thermal polymerization initiator can be used. Examples of the thermal polymerization initiator include an azo-based compound such as 2,2'-azobisisobutyronitrile, 2,2'-azobis(2-methylbutyronitrile), 2,2-azobis(2,4-dimethylvaleronitrile), and dimethyl 2,2'-azobis(2-methylpropionate); and peroxide such as benzoyl peroxide and lauroyl peroxide.

The amount of the polymerization initiator used is preferably about 0.005 parts by mass or more and about 0.5 parts by mass or less based on 100 parts by mass of the polymerizable component. By setting the amount of the polymerization initiator used to be about 0.005 parts by mass or more, a practical polymerization rate can be secured. By setting the amount of the polymerization initiator used to be about 0.5 parts by mass or less, the molecular weight of the polymerization product can be increased to a degree sufficient for coating formation.

By heating the polymerizable precursor composition in the presence of the polymerization initiator, it is possible to obtain a polymerization product of an acrylate monomer having a branched alkyl group having 24 or more carbon atoms, an acrylic monomer having a benzophenone structure, and an acrylate monomer having an alkyl group having optionally from 4 to 20 carbon atoms. The polymerization product contains a copolymer of an acrylate monomer having a branched alkyl group having 24 or more carbon atoms and an acrylic monomer having a benzophenone structure, and optionally contains a homopolymer of each polymerizable component, a copolymer of two or more components of the polymerizable components, and/or an unreacted polymerizable component (unreacted monomer). The remaining unreacted monomer is polymerized by applying an acrylic polymer release agent to the substrate and irradiating with radiation such as ultraviolet rays or electron beams, and is incorporated into the cured product of the acrylic polymer release agent.

Since a polymerization mode may vary, but a polymer having a high molecular weight that is advantageous for coating formation is obtained, solution polymerization performed by dissolving the polymerizable component in a solvent is preferable. When the solution polymerization is used, a solution of the polymerization product can be used as is as an acrylic polymer release agent after the completion of the polymerization. As a polymerization solvent, aliphatic hydrocarbons such as n-hexane and n-heptane, esters such as ethyl acetate and butyl acetate, ketones such as methyl ethyl ketone and methyl isobutyl ketone, or a mixed solvent thereof can be used. From the viewpoint of molecular weight control, a chain transfer agent or a chain extender can also be used. Examples of the chain transfer agent include a thiol compound such as 2-mercaptoethanol. 3-mercapto-2-butanol, 3-mercapto-2-propanol, 3-mercapto-1-propanol, dodecanethiol, isooctyl thioglycolate, and 2-mercapto-ethylamine. Examples of the chain extender include a divalent acrylic monomer such as 1,6-hexanediol diacrylate, 1,9-nonanediol diacrylate, polyethylene glycol diacrylate, and polypropylene glycol diacrylate. The solution polymerization of the polymerizable precursor composition can be performed under an inert gas atmosphere, such as nitrogen gas, for from about 2 hours to about 100 hours at a reaction temperature of from about 50° C. to about 100° C.

The weight average molecular weight (Mw) of the polymerization product is preferably about 500000 or greater, more preferably about 800000 or greater, and even more preferably about 1000000 or greater. By setting the weight average molecular weight of the polymerization product to be about 500,000 or more, the releasing force can be reduced, the film formability can be enhanced, and the residual adhesive force of the adhesive agent can be maintained. In the present disclosure, “weight average molecular weight” is a molecular weight in terms of polystyrene standard by the gel permeation chromatography (GPC) method.

The weight average molecular weight (Mw) of the polymerization product is preferably about 5000000 or less, more preferably about 4000000 or less, and even more preferably about 3000000 or less. By setting the weight average molecular weight of the polymerization product to be about 5000000 or less, the solid content of the acrylic polymer release agent can be increased and the amount of the solvent used can be reduced while the acrylic polymer release agent has a viscosity appropriate for application.

According to a second embodiment, an acrylic polymer release agent contains a polymerization product of a polymerizable precursor composition containing about 99 mass % or greater of acrylate monomer having a branched alkyl group having 24 or more carbon atoms, based on the polymerizable component. In the second embodiment, unlike the first embodiment, the polymerizable precursor composition does not include an acrylic monomer having a benzophenone structure as an essential component. However, in fields where the time for photopolymerization can be guaranteed, or in situations where equipment with high light intensity can be used, by containing an acrylate monomer having a branched alkyl group having 24 or more carbon atoms in a large amount of about 99 mass % or greater based on the polymerizable component, similar to the first embodiment, it is possible to form a release coating that exhibits a smooth light releasing force at a wide release rate.

The acrylate monomers having a branched alkyl group having 24 or more carbon atoms are as described in the first embodiment except for the content. The content of the acrylate monomer having a branched alkyl group having 24 or more carbon atoms in the polymerizable precursor composition is preferably about 99.5 mass % or greater, about 99.8 mass % or greater, or 100 mass % or greater, based on the polymerizable component.

The polymerizable precursor composition may contain an acrylate monomer having an alkyl group having from 4 to 20 carbon atoms. The acrylate monomer having an alkyl group having from 4 to 20 carbon atoms is as described in the first embodiment except for the content. The content of the acrylate monomer having an alkyl group having from 4 to 20 carbon atoms in the polymerizable precursor composition is preferably about 1 mass % or less, about 0.5 mass % or less, or about 0.2 mass % or less, based on the polymerizable component.

A method of obtaining a polymerizable component by polymerizing the polymerization initiator, the chain transfer agent, the chain extender, and the polymerizable precursor composition, and the weight average molecular weight of the obtained polymerizable component are as described in the first embodiment.

The acrylic polymer release agent may contain a photopolymerization initiator. By using the photopolymerization initiator, it is possible to promote the formation of the cured product of the acrylic polymer release agent and the bonding the cured product to the substrate. Examples of the photopolymerization initiator include benzophenone, 4-methylbenzophenone, 4-phenylbenzophenone, 4,4'-bis(dimethylamino) benzophenone, and methyl 2-benzoylbenzoate. From the viewpoint of reducing organic contamination due to a decomposition product of the photopolymerization initiator, it is advantageous that the acrylic polymer release agent does not contain a photopolymerization initiator.

In an embodiment, the acrylic polymer release agent is substantially free of or free of silicone and fluorine compounds. The acrylic polymer release agent of this embodiment can provide a NSNF release liner suitable for electronic components such as HDD or electronic products and a NSNF double-sided tape produced using the NSNF release liner or an adhesive transfer tape. In the present disclosure, "substantially free of silicone and fluorine compounds" means that the total of the silicone and the fluorine compounds contained in the acrylic polymer release agent is less than 1 part by mass, preferably less than 0.5 parts by mass, and more preferably less than 0.1 parts by mass, based on 100 parts by mass of solid content of an acrylic copolymer release agent.

A release sheet according to an embodiment includes a substrate and a release coating containing a cured product of the acrylic polymer release agent disposed on the substrate.

Examples of the substrate include a plastic film such as polyester and polyolefin, paper, or paper substrates coated with such a plastic material. A colored film may be used as an example of the substrate. The colored film may be a mixture of dyes in the plastic, a colored paper, or a transparent film coated with colored ink. For example, an example using a white film as a colored film will be described later. By using a colored film, it becomes easier for the user to recognize the release sheet. Further, a logo, instructions on how to use, or the like may be printed on the film. By using a colored film, it becomes easier for the user to see these printed characters and the like. The thickness of the substrate may vary depending on the application, for example, it can be about 1 μm or greater and about 300 μm or less.

The release sheet can be produced, for example, using the following procedure. An acrylic polymer release agent is diluted with, as necessary, aliphatic hydrocarbons such as n-hexane and n-heptane, aromatic hydrocarbons such as toluene and xylene, esters such as ethyl acetate and butyl acetate, ketones such as methyl ethyl ketone and methyl isobutyl ketone, or halogenated hydrocarbons such as methylene chloride, or a mixed solvent of these substances. Then, the obtained solution is applied onto the substrate with a predetermined thickness by using a bar coater, a roll coater, a spray, or the like, and as necessary, is dried by heating to form a release precursor layer on the substrate. The diluent solvent may be the same as or different from the solvent when solution polymerization is performed. The amount of acrylic polymer release agent applied can vary depending on the substrate. The acrylic polymer release agent is generally applied so that a dry thickness is about 0.01 μm or greater and about 10 μm or less. In a case where the substrate is a plastic film such as polyester or polyolefin, the dry thickness is generally about 0.05 μm or greater and about 1 μm or less. In a case of a substrate such as paper having absorbency or low smoothness, the dry thickness is generally about 0.1 μm or greater and about 5 μm or less.

The release precursor layer is then irradiated with radiation such as electron beams or ultraviolet rays to form a release coating on the substrate. The release coating adheres to the substrate by irradiation with radiation. In this way, the release sheet can be obtained. In a case of the irradiation with electron beams, the absorption amount depends on the thickness and composition of the release precursor layer, and is typically from about 1 kGy to about 100 kGy. In a case of the irradiation with ultraviolet rays, the ultraviolet ray energy depends on the thickness and composition of the release precursor layer. The ultraviolet ray energy is typically from about 10 $mJ/cm^2$ to about 3000 $mJ/cm^2$, and preferably from about 20 $mJ/cm^2$ to about 500 $mJ/cm^2$. Since the irradiation with ultraviolet rays does not require a large-scale device unlike the irradiation with electron beams, it is possible to produce a release sheet with low cost and high productivity.

The release sheet of another embodiment includes a substrate having a first surface and a second surface opposite the first surface, a first release coating disposed on the first surface of the substrate, and a second release coating disposed on the second surface of the substrate. The first release coating contains a cured product of an acrylic polymer release agent. The first release coating and the second release coating may be the same as or different from each other. The second release coating may contain a cured product of an acrylic polymer release agent and may be formed of other release agents. For example, in a case where the release sheet of this embodiment is used in a double-sided tape distributed in a roll shape wound on a core, the release sheet can be disposed so that the outer peripheral surface side is a first release coating (light release coating) and the inner peripheral surface side is a second release coating (heavy release coating).

The tape of an embodiment includes a release sheet having a substrate and a release coating containing a cured product of an acrylic polymer release agent disposed on the substrate, and an adhesive layer laminated on the release coating of the release sheet. This adhesive layer is also referred to as a transfer tape when used in an aspect in which the adhesive layer is isolated from a release sheet and adhered to an adherend.

The tape of this embodiment may further include a supporting substrate such as paper, a plastic film, a foam material such as acryl or urethane, and non-woven fabric, which is laminated on the surface of the adhesive layer opposite the release sheet. In this embodiment, in a case where the surface of the supporting substrate on the opposite side to the surface facing the adhesive layer has the second adhesive layer, the substrate is in the form of a so-called double-sided tape with a substrate (including a transfer tape with a substrate). In a case where the surface of the supporting substrate opposite the surface facing the adhesive layer does not have an adhesive layer, it is in the form of a so-called single-sided tape.

The adhesive layer can be formed by using, for example, an adhesive agent containing an adhesive polymer such as an acrylic, polyolefin-based, polyurethane-based, polyester-based, or rubber-based polymer. Silicone-based adhesive is also applicable, if the requirement meets with Silicone specification. The adhesive agent may be solvent-based, emulsion-based, or solvent-free. The adhesive agent may be a hot melt adhesive agent, a thermoset adhesive agent, or an ultraviolet light curable adhesive agent. In an embodiment, the adhesive layer is formed using a solvent-based acrylic adhesive agent. The adhesive agent may be applied directly onto the release sheet to form an adhesive layer. The adhesive layer formed on the liner may be transferred and laminated onto the release sheet. The adhesive layer may or may not have a support made of paper, plastic film, non-woven fabric, or the like therein.

The thickness of the adhesive layer can typically be about 1 μm or greater, about 5 μm or greater, or about 10 μm or greater, and about 100 μm or less, about 80 μm or less, or about 50 μm or less.

In an embodiment, the releasing force from the adhesive layer of the release sheet is less than 0.1 N/cm. A release sheet having a releasing force of less than 0.1 N/cm is suitable for use as a light release liner for a double-sided tape or adhesive transfer tape.

In an embodiment, the residual adhesive force of the adhesive layer after removing the release sheet is about 85% or greater, about 90% or greater, or about 95% or greater of the residual adhesive force of the adhesive layer to which the release sheet was not applied.

The double-sided tape of an embodiment includes a release sheet having a substrate and a release coating containing a cured product of an acrylic polymer release agent disposed on the substrate, an adhesive layer, and a second release sheet in this order. The second release sheet is a heavy release sheet including a second substrate and a heavy release coating containing a cured product of a second acrylic polymer release agent disposed on the second substrate. The release coating of the release sheet and the heavy release coating of the second release sheet are laminated to be in contact with the adhesive layer.

FIG. 1 illustrates a schematic cross-sectional view of a double-sided tape according to an embodiment. A double-sided tape 100 is a laminate of a release sheet 10 (light release sheet) including a substrate 12 and a release coating 14 (light release coating) disposed on the substrate 12, an adhesive layer 20, and a second release sheet 30 (heavy release sheet) including a second substrate 32 and a gun release coating 34 disposed on the second substrate 32. The release coating 14 of the release sheet 10 and the heavy release coating 34 of the second release sheet 30 are in contact with the adhesive layer 20.

A double-sided tape of another embodiment includes a release sheet including a substrate having a first surface and a second surface opposite the first surface, a first release coating disposed on the first surface of the substrate, and a second release coating disposed on the second surface of the substrate, and an adhesive layer having a first surface and a second surface opposite the first surface, in which the double-sided tape is a wound roll, the first surface of the adhesive layer comes into contact with the first release coating of the release sheet, and the second surface of the adhesive layer comes into contact with the second release coating of the release sheet. The first release coating contains a cured product of an acrylic polymer release agent. The second release coating is a heavy release coating containing a cured product of a second acrylic polymer release agent. In this embodiment, the release sheet can be disposed so that the outer peripheral surface side of the double-sided tape is a first release coating (light release coating) and the inner peripheral surface side is a second release coating (heavy release coating).

The second acrylic polymer release agent contains a polymerization product of a second polymerizable precursor composition containing a 50 mass % or more of acrylate monomer having an alkyl group having less than 24 carbon atoms, based on the polymerizable component. Examples of the acrylate monomer having an alkyl group having less than 24 carbon atoms include butyl acrylate (4 carbon atoms), hexyl acrylate (6 carbon atoms), octyl acrylate (8 carbon atoms), 2-ethylhexyl acrylate (8 carbon atoms), decyl acrylate (10 carbon atoms). 8-methylnonyl acrylate (10 carbon atoms), dodecyl acrylate (12 carbon atoms), tridecyl acrylate (13 carbon atoms), tetradecyl acrylate (14 carbon atoms), hexadecyl acrylate (16 carbon atoms), octadecyl acrylate (18 carbon atoms), isooctadecyl acrylate (18 carbon atoms), 2-hexyldodecyl acrylate (18 carbon atoms), 2-octyldecyl acrylate (18 carbon atoms), icosyl acrylate (20 carbon atoms), and docosyl acrylate (C22). The content of the acrylate monomer having an alkyl group having less than 24 carbon atoms in the second polymerizable precursor composition is preferably about 60 mass % or greater, about 70 mass % or greater, or about 80 mass % or greater, based on the polymerizable component.

The remainder of the polymerizable components of the second polymerizable precursor composition may be an acrylate monomer having a linear or branched alkyl group having 24 or more carbon atoms, an acrylic monomer having a benzophenone structure, other radical polymerizable monomers, or a combination thereof. The acrylate monomer having a branched alkyl group having 24 or more carbon atoms and the acrylic monomer having a benzophenone structure are as described in the first embodiment. Examples of the acrylic monomer having a linear alkyl group having 24 or more carbon atoms include tetracosyl acrylate (C24), octacosyl acrylate (C28), and dotriacyl acrylate (C32) Examples of other radical polymerizable monomers include styrene, cyclohexyl acrylate, isobornyl acrylate, 3,3,5-trimethylcyclohexyl acrylate, dicyclopentanyl acrylate, and dicyclopentenyl acrylate.

As for the second polymerizable precursor composition, a method of obtaining a polymerizable component by polymerizing the polymerization initiator, the chain transfer agent, the chain extender, and the polymerizable precursor composition, and the weight average molecular weight of the obtained polymerizable component are as described in the first embodiment.

The method of producing the second release sheet using the second acrylic polymer release agent is the same as the acrylic polymer release agent described above. The double-sided tape can be produced by laminating the second release sheet on the adhesive layer of the tape. The double-sided tape can also be produced by forming an adhesive layer on the second release sheet and laminating the release sheet thereon.

In an embodiment, the releasing force between the second release sheet (heavy release sheet) and the adhesive layer is about 2.5 times or more, about 4 times or more, about 10 times or less, or about 5 times or less the releasing force between the release sheet (light release sheet) and the adhesive layer.

In an embodiment, the releasing force between the second release sheet (heavy release sheet) and the adhesive layer is about 1 N/10 mm or less, or about 0.5 N/10 mm or less.

The acrylic polymer release agent, release sheet, tape, and double-sided tape of the present disclosure can be used in applications where a very light releasing force is required. The release sheet using the acrylic polymer release agent of the present disclosure can be particularly suitably used on the light release surface of the NSNF adhesive transfer tape (ATT).

EXAMPLES

In the following examples, specific embodiments of the present disclosure will be exemplified, but the present invention is not limited to those embodiments. All parts and percent are based on mass unless otherwise specified.

Materials used to prepare or produce an acrylic polymer release agent, a release sheet, and a tape are indicated in Table 1.

TABLE 1

| Name or Abbreviation | Composition or Description | Supplier |
|---|---|---|
| NK Ester IDDA (iso-C12 acrylate) | Isododecyl acrylate | Shin-Nakamura Chemical Co., Ltd. (Wakayama-shi, Wakayama, Japan) |
| HEDA16 (iso-C16 acrylate) | 2-Hexyldecyl acrylate | TOHO Chemical Industry Co., Ltd. (Chuo-ku, Tokyo, Japan) |
| NK Ester ISA (iso-C18 acrylate) | Isostearyl acrylate (Isooctadecyl acrylate) | Shin-Nakamura Chemical Co., Ltd. (Wakayama-shi, Wakayama, Japan) |
| NK Ester ITECA (iso-C24 acrylate) | 2-Decyl tetradecyl acrylate | Shin-Nakamura Chemical Co., Ltd. (Wakayama-shi, Wakayama, Japan) |
| STA (ODA) (Linear C18 acrylate) | Stearyl acrylate (Octadecyl acrylate) | Osaka Organic Chemical Industry LTD. (Osaka-shi, Osaka, Japan) |
| Blemmer (trade name) VA (Linear C22 acrylate) | Behenyl acrylate (Docosyl acrylate) | NOF CORPORATION (Shibuya-ku, Tokyo, Japan) |
| IOA | Isooctyl acrylate | "3M |
| AA | Acrylic acid | "Mitsubishi Chemical Corporation |
| AEBP | 4-Acryloyloxyethoxy benzophenone | 3M (Saint Paul, MN, USA) |
| ABP | 4-Acryloyloxy benzophenone | 3M (Saint Paul, MN, USA) |
| V-601 | Dimethyl 2,2'-azobis(2-methylpropionate) | FUJIFILM Wako Pure Chemical Corporation (Osaka-shi, Osaka, Japan) |
| V-65 | 2,2'-Azobis(2,4-dimethylvaleronitrile) | FUJIFILM Wako Pure Chemical Corporation (Osaka-shi, Osaka, Japan) |
| NK Ester A-NOD-N (NDDA) | 1,9-nonanediol diacrylate | Shin-Nakamura Chemical Co., Ltd. (Wakayama-shi, Wakayama, Japan) |
| Olivine (trade name) BPS 5127 | Solvent-based acrylic adhesive | TOYOCHEM Co., Ltd. (Chuo-ku, Tokyo, Japan) |
| Coronate L-45E | Polyisocyanate | TOSOH Corporation (Minato-ku, Tokyo, Japan) |
| Emblet (trade name) S-50 | Polyester film, thickness 50 μm | UNITIKA Ltd. (Osaka-shi, Osaka, Japan) |
| SP-PET (trade name) 3801-BU | Silicone-coated polyester film, thickness 38 μm | Mitsui Chemicals Tohcello. Inc. (Chiyoda-ku, Tokyo, Japan) |
| Lumirror (trademark) #75-E20 | White polyester film, thickness 75 μm | "Toray Industries, Inc. |
| Crisper (trademark) K1212-100 | White polyester film, thickness 100 μm | "Toyobo Co., Ltd. |

Synthesis Example 1 (Iso-C20 Acrylate)

From an esterification reaction of 2-octyl-1-dodecanol (iso-C20 alcohol) with acryloyl chloride using the reaction conditions and purification method disclosed in Method 2, page 13, U.S. Pat. No. 8,137,807, iso-C20 acrylate (2-octyl dodecyl acrylate) was synthesized. It was confirmed by the IR spectrum that iso-C20 acrylate was produced.

Synthesis Example 2 (Iso-C28 Acrylate)

From an esterification reaction of 2-dodecyl-1-hexadecanol (iso-C28 alcohol) with acryloyl chloride using the reaction conditions and purification method disclosed in Method 2, page 13, U.S. Pat. No. 8,137,807, iso-C28 acrylate (2-dodecyl hexadecyl acrylate) was synthesized.

Synthesis Example 3 (Iso-C32 Acrylate)

From an esterification reaction of 2-tetradecyl-1-octadecanol (iso-C32 alcohol) with acryloyl chloride using the reaction conditions and purification method disclosed in Method 2, page 13, U.S. Pat. No. 8,137,807, iso-C32 acrylate (2-tetradecyl octadecyl acrylate) was synthesized.

A polymerization product contained in the acrylic polymer release agent (also referred to as "precursor polymer" in this example) was prepared by the following procedure, which includes solution polymerization of the polymerizable precursor composition.

Precursor Polymer 1

100 parts by mass of iso-C16 acrylate and 0.2 parts by mass of AEBP were mixed to obtain a monomer mixture. The monomer mixture was diluted with a mixed solvent of ethyl acetate/n-heptane (50 mass %/50 mass %) and diluted to a monomer concentration of 75 mass %. Further, 0.1 parts by mass of V-601 was added to 100 parts by mass of the monomer component as an initiator to obtain a polymerizable precursor composition 1. A system containing the polymerizable precursor composition 1 was purged with nitrogen gas for 2 minutes, and then solution polymerization was performed for 48 hours in a constant temperature bath at 65° C. to obtain a transparent viscous solution. The weight average molecular weight (Mw) of the obtained polymerization product was about $1.80\times10^6$. In this example, the weight average molecular weight of the polymerization product is a value in terms of polystyrene standard measured in a chloroform solvent using gel permeation chromatography (GPC).

Precursor Polymer 4

A precursor polymer 4 was prepared by the same procedure as for the precursor polymer 1, except that iso-C16 acrylate was changed to iso-C24 acrylate, 0.2 parts by mass of V-601 was added to 100 parts by mass of the monomer component, and 0.1 parts by mass of the NDDA was added to 100 parts by mass of the monomer component. The weight average molecular weight (Mw) of the obtained polymerization product was about $1.88\times10^6$.

Precursor Polymer 9

A precursor polymer 9 was prepared by the same procedure as for the precursor polymer 1, except that iso-C16 acrylate was changed to iso-C24 acrylate, AEBP was changed to ABP, 0.2 parts by mass of V-601 was added to 100 parts by mass of the monomer component, and 0.1 parts by mass of the NDDA was added to 100 parts by mass of the monomer component. The weight average molecular weight (Mw) of the obtained polymerization product was about $1.9\times10^6$.

Precursor Polymer 10

A precursor polymer 10 was prepared by the same procedure as for the precursor polymer 1, except that iso-C16 acrylate was changed to iso-C24 acrylate, AEBP was not used, 0.2 parts by mass of V-601 was added to 100 parts by mass of the monomer component, and 0.1 parts by mass of the NDDA was added to 100 parts by mass of the monomer component. The weight average molecular weight (Mw) of the obtained polymerization product was about $1.74\times10^6$.

Precursor Polymer 15

A precursor polymer 15 was prepared by the same procedure as for the precursor polymer 1, except that iso-C16 acrylate was changed to a 1:1 (mass ratio) mixture of linear C18 acrylate to linear C22 acrylate, 0.2 parts by mass of V-601 was added to 100 parts by mass of the monomer component, and a monomer concentration was set to 50 mass %. The weight average molecular weight (Mw) of the obtained polymerization product was about $1.27\times10^6$.

Precursor Polymer 16

A precursor polymer 16 was prepared by the same procedure as for the precursor polymer 1, except that iso-C16 acrylate was changed to iso-C12 acrylate, V-601 was changed to V-65, and a solvent was changed to ethyl acetate to set the monomer concentration to 50 mass %. The weight average molecular weight (Mw) of the obtained polymerization product was about $1.89\times10^6$.

Precursor Polymers 2, 3, 5 to 8, and 11 to 14

Precursor polymers 2, 3, 5 to 8, and 11 to 14 prepared by the same procedure as for the precursor polymers 1 and 4 or 9, except that the types of acrylates, other components and their additional amounts, and monomer concentrations were set as indicated in Table 2. The weight average molecular weights (Mw) of the obtained polymerization products are indicated in Table 2.

Details of the precursor polymers are indicated in Table 2.

TABLE 2

(parts by mass: values based on 100 parts by mass of acrylate)

| Precursor Polymer | Acrylate | AEBP [parts by mass] | ABP [parts by mass] | NDDA [parts by mass] | V-601 [parts by mass] | V-65 [parts by mass] | Monomer concentration [% by mass] | Quantity average Molecular weight Mn | Weight average Molecular weight Mw | Poly-dispersity Mw/Mn |
|---|---|---|---|---|---|---|---|---|---|---|
| 1 | iso-C16 | 0.2 | — | — | 0.1 | — | 75 | 2.34E+05 | 1.80E+06 | 7.71 |
| 2 | iso-C18 | 0.2 | — | — | 0.2 | — | 70 | 7.54E+04 | 7.51E+05 | 9.95 |
| 3 | iso-C20 | 0.2 | — | — | 0.1 | — | 70 | 2.00E+05 | 1.50E+06 | 7.48 |
| 4 | iso-C24 | 0.2 | — | 0.1 | 0.2 | — | 75 | 1.98E+05 | 1.88E+06 | 9.50 |
| 5 | iso-C28 | 0.2 | — | 0.2 | 0.1 | — | 75 | 1.90E+05 | 2.35E+06 | 12.38 |
| 6 | iso-C32 | 0.2 | — | 0.2 | 0.1 | — | 75 | 1.85E+05 | 1.10E+06 | 5.97 |
| 7 | iso-C32 | 0.2 | — | — | 0.2 | — | 75 | 1.57E+05 | 7.39E+05 | 4.71 |
| 8 | iso-C18 | 0.2 | — | 0.1 | 0.05 | — | 40 | 1.68E+05 | 2.33E+06 | 13.88 |

TABLE 2-continued (parts by mass: values based on 100 parts by mass of acrylate)

| Precursor Polymer | Acrylate | AEBP [parts by mass] | ABP [parts by mass] | NDDA [parts by mass] | V-601 [parts by mass] | V-65 [parts by mass] | Monomer concentration [% by mass] | Quantity average Molecular weight Mn | Weight average Molecular weight Mw | Poly-dispersity Mw/Mn |
|---|---|---|---|---|---|---|---|---|---|---|
| 9 | iso-C24 | — | 0.2 | 0.1 | 0.2 | — | 75 | 1.79E+05 | 1.90E+06 | 10.63 |
| 10 | iso-C24 | — | — | 0.1 | 0.2 | — | 75 | 1.87E+05 | 1.74E+06 | 9.33 |
| 11 | iso-C28 | — | — | 0.2 | 0.1 | — | 75 | 1.87E+05 | 1.16E+06 | 6.23 |
| 12 | iso-C32 | — | 0.2 | 0.2 | 0.1 | — | 75 | 1.94E+05 | 1.69E+06 | 8.74 |
| 13 | Straight chain C22 | 0.2 | — | — | 0.2 | — | 55 | 2.42E+05 | 1.71E+06 | 7.04 |
| 14 | Straight chain C18 | 0.2 | — | — | 0.2 | — | 50 | 2.18E+05 | 1.49E+06 | 6.83 |
| 15 | Straight chain C18/ straight chain C22 | 0.2 | — | — | 0.2 | — | 50 | 2.11E+05 | 1.27E+06 | 6.05 |
| 16 | iso-C12 | — | — | — | — | 0.1 | 50 | 2.97E+05 | 1.89E+06 | 6.36 |

Example 1

A release sheet was prepared by the following procedures. An acrylic polymer release agent was prepared by diluting the precursor polymer 4 to 1 mass % using a mixed solvent (50 mass %/50 mass %) of toluene/methyl ethyl ketone (MEK). The resulting acrylic polymer release agent was applied onto the polyester film S-50 using a bar coater (#04). The solvent was evaporated to form a release precursor layer of about 0.1 μm thickness. The release sheet was produced by curing the release precursor layer by irradiating a polyester film having the release precursor layer with ultraviolet rays for one pass using an ultraviolet irradiation apparatus (F300, medium pressure mercury lamp (H bulb), Heraeus (Hanau, Hessen, Germany)) at a line speed of 20 m/min in a nitrogen gas atmosphere. When irradiated, the ultraviolet irradiation conditions per pass as measured by a UV POWER PUCK (trade name) available from EIT was 350 $mJ/cm^2$, UVA 168 $mJ/cm^2$, UVB 158 $mJ/cm^2$, and UVC 24 $mJ/cm^2$.

Examples 2 to 10, Comparative Examples 1 to 7, and Reference Example 1

A release sheet was produced in the same manner as in Example 1 using the precursor polymer indicated in Table 3 instead of the precursor polymer 4. Examples 3, 4, and 8 (precursor polymers 6, 7, and 12) were diluted to 1 mass % using a toluene/methyl ethyl ketone (MEK)/n-heptane mixed solvent (34 mass %/33 mass %/33 mass %) instead of a toluene/MEK mixed solvent (50 mass %/50 mass %) so as to prepare an acrylic polymer release agent. For Example 9, a release sheet was produced in the same manner as in Example 8 by applying acrylic polymer release agent onto white color polyester film #75-E20 instead of applying onto polyester film S-50. For Example 10, a release sheet was produced in the same manner as in Example 8 by using 1.5 mass % diluted solution instead of 1 mass % diluted solution and applying onto white color polyester film K1212-100 instead of applying onto polyester film S-50. For Example 4 (precursor polymer 7), irradiation was performed for 8 passes under the same ultraviolet irradiation conditions per pass as in Example 1. For Examples 6 and 7 (precursor polymers 10 and 11), irradiation was performed for 10 passes under the same ultraviolet irradiation conditions per pass as in Example 1. Reference Example 1 is a heavy release surface sheet.

Comparative Example 8

A silicone-coated polyester film SP-PET (trade name) 3801-BU was used as the release sheet.

Details of the release sheet are indicated in Table 3.

TABLE 3

| | Precursor Polymer | Acrylate | UV irradiation count [pass] |
|---|---|---|---|
| Comparative Example 1 | 1 | iso-C16 | 1 |
| Comparative Example 2 | 2 | iso-C18 | 1 |
| Comparative Example 3 | 3 | iso-C20 | 1 |
| Example 1 | 4 | iso-C24 | 1 |
| Example 2 | 5 | iso-C28 | 1 |
| Example 3 | 6 | iso-C32 | 1 |
| Example 4 | 7 | iso-C32 | 8 |
| Comparative Example 4 | 8 | iso-C18 | 1 |
| Example 5 | 9 | iso-C24 | 1 |
| Example 6 | 10 | iso-C24 | 10 |
| Example 7 | 11 | iso-C28 | 10 |
| Example 8 | 12 | iso-C32 | 1 |
| Comparative Example 5 | 13 | Straight chain C22 | 1 |
| Comparative Example 6 | 14 | Straight chain C18 | 1 |
| Comparative Example 7 | 15 | Straight chain C18/ straight chain C22 | 1 |
| Comparative Example 8 | | SP-PET | — |
| Reference Example 1 (heavy release surface) | 16 | iso-C12 | 1 |
| Example 9 | 6 | iso-C32 | 1 |
| Example 10 | 6 | iso-C32 | 1 |

Simple Releasing Test

As a preliminary evaluation of the releasing characteristics, 3M (trade name) #810 tape (width 18 mm, length 150 mm, 3M Japan Limited (Shinagawa-ku, Tokyo, Japan)) was attached to the release sheet using a roller and left to stand for 3 days at 70° C., and then left to stand at room temperature overnight. An exposed surface (the back side of the surface having release agent) of a release sheet S-50 (or #75-E20, K1212-100) was attached to a SUS plate using a double-sided tape. The releasing force was measured when the #810 tape was released in a 180 degree direction at a release rate of 300 mm/min using a precision universal tester, Autograph AG-X (Shimadzu Corporation, Kyoto, Kyoto Prefecture, Japan). The results are indicated in Table 4.

TABLE 4

| | Precursor Polymer | Acrylate | Peeling force [N/18 mm] |
|---|---|---|---|
| Comparative Example 1 | 1 | iso-C16 | 0.175 |
| Comparative Example 2 | 2 | iso-C18 | 0.110 |
| Comparative Example 3 | 3 | iso-C20 | 0.105 |
| Example 1 | 4 | iso-C24 | 0.079 |

TABLE 4-continued

| | Precursor Polymer | Acrylate | Peeling force [N/18 mm] |
|---|---|---|---|
| Example 2 | 5 | iso-C28 | 0.073 |
| Example 3 | 6 | iso-C32 | 0.064 |
| Comparative Example 5 | 13 | Straight chain C22 | 3.20 |
| Comparative Example 6 | 14 | Linear C18 | 2.93 |
| Comparative Example 7 | 15 | Straight chain C18/ Straight chain C22 | 2.89 |
| Reference Example 1 (heavy release surface) | 16 | iso-C12 | 0.224 |
| Example 9 | 6 | iso-C32 | 0.082 |
| Example 10 | 6 | iso-C32 | 0.120 |

As for the release sheet of Example 4 (precursor polymer 7), the same releasing force as that of Example 3 (precursor polymer 6) having the same acrylate was obtained. Releasing force and Residual adhesive force The releasing force and residual adhesive force of the tape produced using the release sheet was evaluated for the tapes produced by two methods: (1) applying an adhesive solution directly onto a release sheet to produce a tape (direct application), and (2) bonding a release sheet to an adhesive layer formed on a substrate to produce a tape (dry laminate).

(1) Direct Application

An adhesive solution was prepared by diluting 100 parts by mass of BPS 5127 with 20 parts by mass of toluene and mixing 0.67 parts by mass of Coronate L-45E therein. The adhesive solution was applied on the release sheet and dried for 3 minutes at 105° C. The dried adhesive layer had a thickness of about 25 μm. A tape was produced by laminating a tape substrate (polyester film S-50) that was pre-coated with 3M (trade name) Primer N-200 (3M Japan Limited (Shinagawa-ku, Tokyo, Japan)) on top of the adhesive layer and left to stand for three days at 70° C.

(2) Dry Laminate

An adhesive solution was prepared by diluting 100 parts by mass of BPS 5127 with 20 parts by mass of toluene and mixing 0.67 parts by mass of Coronate L-45E therein. The adhesive solution was applied onto a tape substrate (polyester film S-50) that was pre-coated with 3M (trade name) Primer N-200 (3M Japan Limited (Shinagawa-ku, Tokyo, Japan)) and dried for 3 minutes at 105° C. The dried adhesive layer had a thickness of about 25 μm. The release sheet was laminated on the adhesive layer and left to stand for 3 days at 70° C. to produce a tape.

(3) Releasing Force

An exposed surface (the back side of the surface having adhesive) of a tape substrate was attached to a SUS plate using a double-sided tape. The releasing force was measured when the release sheet was released in a 180 degree direction at a release rate of 300 mm/min using a precision universal tester, Autograph AG-X (Shimadzu Corporation, Kyoto, Kyoto Prefecture, Japan). The results are indicated in Table 5.

(4) Residual Adhesive Force

After testing the releasing force, the tape remaining on the SUS plate was released from the double-sided tape, and the exposed adhesive layer was attached to a SUS304 (BA) plate. After the plate was left to stand for 30 minutes at room temperature, the adhesive force was measured as the residual adhesive force when the tape was released in a 180 degree direction at a release rate of 300 mm/min using a precision universal tester, Autograph AG-X (Shimadzu Corporation, Kyoto, Kyoto Prefecture, Japan). The results are indicated in Table 5.

TABLE 5

(in the table, NT means not tested.)

| | | | Peeling force [N/10 mm] | | Peeling force ratio: heavy release surface/ light release surface | | Residual adhesive strength [N/10 mm] | |
|---|---|---|---|---|---|---|---|---|
| | Precursor Polymer | Acrylate | Direct application | Dry lamination | Direct application | Dry lamination | Direct application | Dry lamination |
| Comparative Example 1 | 1 | iso-C16 | 0.199 | 0.178 | 1.4 | 1.5 | 4.255 | 4.402 |
| Comparative Example 2 | 2 | iso-C18 | 0.128 | 0.134 | 2.2 | 1.9 | 4.343 | 4.417 |
| Comparative Example 3 | 3 | iso-C20 | 0.122 | 0.118 | 2.3 | 2.2 | 4.255 | 4.757 |
| Example 1 | 4 | iso-C24 | 0.097 | 0.093 | 2.9 | 2.8 | 4.225 | 4.609 |
| Example 2 | 5 | iso-C28 | 0.097 | 0.095 | 2.9 | 2.7 | 4.210 | 4.373 |
| Example 3 | 6 | iso-C32 | 0.082 | 0.083 | 3.4 | 3.1 | 4.136 | 4.373 |
| Example 4 | 7 | iso-C32 | 0.086 | 0.097 | 3.2 | 2.7 | 4.711 | 4.242 |
| Comparative Example 4 | 8 | iso-C18 | 0.135 | 0.124 | 2.1 | 2.1 | 4.496 | 4.459 |
| Example 5 | 9 | iso-C24 | 0.096 | 0.093 | 2.9 | 2.8 | 4.268 | 4.623 |
| Example 6 | 10 | iso-C24 | 0.082 | 0.086 | 3.4 | 3.0 | 4.295 | 4.623 |
| Example 7 | 11 | iso-C28 | 0.073 | 0.071 | 3.8 | 3.7 | 4.432 | 4.432 |
| Example 8 | 12 | iso-C32 | 0.077 | 0.073 | 3.6 | 3.5 | 4.541 | 4.651 |
| Comparative Example 8 | SP-PET | | NT | 0.044 | NT | 5.9 | NT | 4.432 |
| Reference Example 1 (heavy release surface) | 16 | iso-C12 | 0.279 | 0.260 | — | — | 4.402 | 4.609 |

As indicated in Table 5, the releasing force ratio of the heavy release surface to the light release surface calculated from the releasing force of Examples 1 to 3 and 5 to 8 (light release surface) and Reference Example 1 (heavy release surface) was 2.9 to 3.8 (direct application) and 2.7 to 3.7 (dry lamination).

Releasing Force and Residual Adhesive Force Test-2

Preparation of Acrylic PSA Solution 90 parts by mass of IOA and 10 parts by mass of AA were mixed and diluted with a mixed solvent of ethyl acetate/methyl ethyl ketone (75 mass %/25 mass %) and diluted to a monomer concentration of 40 mass %. Further, 0.15 parts by mass of V-601 was added to 100 parts by mass of the monomer component as an initiator to obtain a polymerizable precursor composition. A system containing the polymerizable precursor composition was purged with nitrogen gas for 2 minutes, and then solution polymerization was performed for 24 hours in a constant temperature bath at 65° C. to obtain a transparent viscous solution. The weight average molecular weight (Mw) of the obtained polymerization product was about $9.1\times10^5$. In this example, the weight average molecular weight of the polymerization product is a value in terms of polystyrene standard measured in a tetrahydrofuran solvent using gel permeation chromatography (GPC).

(1) Direct Application 100 parts of the prepared polymer solution was firstly mixed with 0.48 part of 1,1-Isophthaloyl bis(2-methylaziridine) solution (3 mass % in toluene). Then, the mixed solution was coated on the prepared release sheet and dried at 120° C. for 3.5 minutes. The dried adhesive layer had a thickness of about 50 μm. A tape was produced by laminating a tape substrate (polyester film S-50) that was pre-coated with 3M (trade name) Primer N-200 (3M Japan Limited (Shinagawa-ku, Tokyo, Japan)) on top of the adhesive layer and left to stand for three days at 70° C.

(2) Dry Laminate 100 parts of the prepared polymer solution was firstly mixed with 0.48 part of 1,1-Isophthaloyl bis(2-methylaziridine) solution (3 mass % in toluene). Then, the mixed solution was applied onto a tape substrate (polyester film S-50) that was pre-coated with 3M (trade name) Primer N-200 (3M Japan Limited (Shinagawa-ku, Tokyo, Japan)) and dried for 3 minutes at 120° C. for 3.5 minutes. The dried adhesive layer had a thickness of about 50 μm. The release sheet was laminated on the adhesive layer and left to stand for 3 days at 70° C. to produce a tape.

(3) Releasing Force and Residual Adhesive Force

The releasing force and the residual adhesive force were measured in a similar manner described above. The results are indicated in Table 6.

TABLE 6

Results for releasing force and residual adhesive force tests

| | Precursor Polymer | Acrylate | Peel force [N/10 mm] Direct application | Peel force [N/10 mm] Dry Lamination | Residual adhesive force [N/10 mm] Direct application | Residual adhesive force [N/10 mm] Dry Lamination |
|---|---|---|---|---|---|---|
| Example 9 | 6 | iso-C32 | 0.052 | 0.050 | 5.958 | 6.375 |
| Example 10 | 6 | iso-C32 | 0.085 | 0.077 | 6.208 | 5.667 |
| Comparative Example 9 | SP-PET | | 0.033 | 0.038 | 5.791 | 6.000 |

REFERENCE SIGNS LIST

100 Double-sided tape
10 Release sheet
12 Substrate
14 Release coating
20 Adhesive layer
30 Heavy release sheet
32 Second substrate
34 Heavy release coating

The invention claimed is:

1. An acrylic polymer release agent comprising:

a polymerization product of a polymerizable precursor composition containing an acrylate monomer having a branched alkyl group having 32 or more carbon atoms and an acrylic monomer having a benzophenone structure.

2. The acrylic polymer release agent according to claim 1, wherein the polymerizable precursor composition contains a 99 mass % or greater of the acrylate monomer having a branched alkyl group having 32 or more carbon atoms, based on a polymerizable component capable of radical polymerization with an acrylate monomer having a branched alkyl group having 32 or more carbon atoms.

3. The acrylic polymer release agent according to claim 1, wherein the polymerizable precursor composition contains a 1 mass % or less of acrylic monomer having the benzophenone structure, based on the polymerizable component.

4. A release sheet comprising:

a substrate; and a release coating containing a cured product of the acrylic polymer release agent described in claim 1 disposed on the substrate.

5. A release sheet according to claim 4, wherein the substrate comprises white film.

6. A tape comprising:

the release sheet described in claim 5 and an adhesive layer laminated on the release coating of the release sheet.

7. The tape according to claim 6, wherein a releasing force from the adhesive layer of the release sheet is less than 0.1 N/cm.

8. The tape of claim 6 and further comprising:

a second release sheet in this order, wherein the second release sheet includes a second substrate and a heavy release coating containing a cured product of a second acrylic polymer release agent disposed on the second substrate, the second acrylic polymer release agent contains a polymerization product of a second polymerizable precursor composition containing a 50 mass % or more of an acrylate monomer having an alkyl group having less than 32 carbon atoms, based on a polymerizable component, and the release coating of the release sheet and the heavy release coating of the second release sheet are laminated to be in contact with the adhesive layer.

9. The tape according to claim 8, wherein a releasing force between the second release sheet and the adhesive layer is 2.5 times or more a releasing force between the release sheet and the adhesive layer.

* * * * *